(12) United States Patent
Bradley

(10) Patent No.: US 9,221,721 B1
(45) Date of Patent: Dec. 29, 2015

(54) THREE-PART PLANT NUTRIENT SYSTEM

(71) Applicant: Treg Bradley, Chandler, AZ (US)

(72) Inventor: Treg Bradley, Chandler, AZ (US)

( * ) Notice: Subject to any disclaimer, the term of this patent is extended or adjusted under 35 U.S.C. 154(b) by 0 days.

(21) Appl. No.: 14/245,906

(22) Filed: Apr. 4, 2014

Related U.S. Application Data

(60) Provisional application No. 61/809,560, filed on Apr. 8, 2013.

(51) Int. Cl.

| | |
|---|---|
| C05B 17/00 | (2006.01) |
| C05B 17/02 | (2006.01) |
| C05D 5/00 | (2006.01) |
| C05D 3/00 | (2006.01) |
| C05D 9/02 | (2006.01) |
| C05D 1/00 | (2006.01) |

(52) U.S. Cl.
CPC ............. *C05B 17/02* (2013.01); *C05B 17/00* (2013.01); *C05D 1/00* (2013.01); *C05D 3/00* (2013.01); *C05D 5/00* (2013.01); *C05D 9/02* (2013.01)

(58) Field of Classification Search
CPC .............. C05D 3/00; C05D 1/00; C05D 5/00; C05D 9/02; C05B 17/00; C05B 17/02
USPC ........................................................ 71/31–63
See application file for complete search history.

(56) References Cited

U.S. PATENT DOCUMENTS

| | | | |
|---|---|---|---|
| 4,652,294 A * | 3/1987 | Arnold ............................... | 71/28 |
| 5,114,459 A * | 5/1992 | Peters et al. ...................... | 71/32 |
| 5,942,021 A * | 8/1999 | Stirrup ............................... | 71/1 |
| 2004/0200248 A1* | 10/2004 | Kirkegaard ....................... | 71/28 |
| 2005/0022569 A1* | 2/2005 | Varshovi ............................. | 71/6 |
| 2014/0323297 A1* | 10/2014 | Harman et al. ............... | 504/101 |

* cited by examiner

*Primary Examiner* — Wayne Langel
(74) *Attorney, Agent, or Firm* — Venjuris, P.C.

(57) ABSTRACT

The present invention is incorporated in a three-part primary nutrient system for facilitating the growth of a plant in any growing media. The first part of the nutrient system comprises calcium and nitrogen and is devoid of magnesium, sulfur, and trace minerals. The second part of the nutrient system comprises nitrogen, phosphorus, potassium, and trace minerals and is devoid of calcium. The third part of the nutrient system comprises potassium, phosphorus, and magnesium and is devoid of calcium.

6 Claims, 3 Drawing Sheets

| Nutrient ppm (mL/gal) | | | |
|---|---|---|---|
| NUTRIENT | Base | Grow | Bloom |
| Total Nitrogen | 10.5 | 5.3 | 0.0 |
| Nitrate | 9.5 | 3.7 | 0.0 |
| Ammonium | 1.1 | 1.6 | 0.0 |
| Phosphorus | 0.0 | 2.3 | 6.9 |
| Potassium | 0.0 | 8.7 | 13.1 |
| Calcium | 13.2 | 0.0 | 0.0 |
| Magnesium | 0.0 | 4.2 | 4.2 |
| Iron | 0.00 | 0.37 | 0.34 |
| Boron | 0.00 | 0.08 | 0.11 |
| Copper | 0.00 | 0.01 | 0.01 |
| Manganese | 0.00 | 0.16 | 0.21 |
| Molybdenum | 0.00 | 0.00 | 0.00 |
| Zinc | 0.00 | 0.01 | 0.01 |

| Growth Stage | Seedlings/Clones | Vegetative | | | Bloom Transition | | | | Flowering/Fruiting | | | Ripening | Flush |
|---|---|---|---|---|---|---|---|---|---|---|---|---|---|
| Photoperiod | 18 | 18 | 18 | 18 | 12 | 12 | 12 | 12 | 12 | 12 | 12 | 12 | 12 |
| Number of Weeks | Week 1 | Week 1 | Week 2 | Week 3 | Week 1 | Week 2 | Week 3 | Week 4 | Week 5 | Week 6 | Week 7 | Week 8 | Week 9 |
| Dilution | mL/gal | mL/gal | mL/gal | mL/gal | mL/gal | mL/gal | mL/gal | mL/gal | mL/gal | mL/gal | mL/gal | mL/gal | mL/gal |
| KIND Base | 3 | 4 | 5 | 6 | 9 | 9 | 12 | 8 | 8 | 8 | 8 | 4 | 0 |
| KIND Grow | 6 | 8 | 10 | 12 | 6 | 4 | 6 | 0 | 0 | 0 | 0 | 0 | 0 |
| Kind Bloom | 0 | 0 | 0 | 0 | 6 | 8 | 12 | 13 | 13 | 14 | 14 | 8 | 0 |
| ELEMENT | ppm | ppm | ppm | ppm | ppm | ppm | ppm | ppm | ppm | ppm | ppm | ppm | ppm |
| Nitrogen | 63 | 84 | 105 | 126 | 126 | 116 | 158 | 84 | 84 | 84 | 84 | 42 | 0 |
| Nitrate | 50 | 67 | 84 | 101 | 107 | 100 | 136 | 76 | 76 | 76 | 76 | 38 | 0 |
| Ammonium | 13 | 17 | 21 | 25 | 19 | 16 | 22 | 8 | 8 | 8 | 8 | 4 | 0 |
| Phosphorus | 14 | 18 | 23 | 28 | 55 | 64 | 97 | 90 | 90 | 97 | 97 | 55 | 0 |
| Potassium | 52 | 70 | 87 | 105 | 131 | 140 | 210 | 170 | 170 | 183 | 183 | 105 | 0 |
| Calcium | 39 | 53 | 66 | 79 | 118 | 118 | 158 | 105 | 105 | 105 | 105 | 53 | 0 |
| Magnesium | 25 | 34 | 42 | 50 | 50 | 50 | 76 | 55 | 55 | 59 | 59 | 34 | 0 |
| Iron | 2.21 | 2.95 | 3.68 | 4.42 | 4.26 | 4.21 | 6.31 | 4.44 | 4.44 | 4.79 | 4.79 | 2.74 | 0 |
| Boron | 0.47 | 0.63 | 0.79 | 0.95 | 1.10 | 1.16 | 1.74 | 1.37 | 1.37 | 1.47 | 1.47 | 0.84 | 0 |
| Copper | 0.03 | 0.04 | 0.05 | 0.06 | 0.06 | 0.06 | 0.09 | 0.07 | 0.07 | 0.07 | 0.07 | 0.04 | 0 |
| Manganese | 0.95 | 1.26 | 1.58 | 1.89 | 2.21 | 2.31 | 3.47 | 2.74 | 2.74 | 2.95 | 2.95 | 1.68 | 0 |
| Molybdenum | 0.02 | 0.02 | 0.03 | 0.03 | 0.03 | 0.03 | 0.05 | 0.03 | 0.03 | 0.04 | 0.04 | 0.02 | 0 |
| Zinc | 0.06 | 0.08 | 0.11 | 0.13 | 0.14 | 0.15 | 0.22 | 0.17 | 0.17 | 0.18 | 0.18 | 0.17 | 0 |

Fig. 1

| Nutrient ppm (mL/gal) | | | |
|---|---|---|---|
| NUTRIENT | Base | Grow | Bloom |
| Total Nitrogen | 10.5 | 5.3 | 0.0 |
| Nitrate | 9.5 | 3.7 | 0.0 |
| Ammonium | 1.1 | 1.6 | 0.0 |
| Phosphorus | 0.0 | 2.3 | 6.9 |
| Potassium | 0.0 | 8.7 | 13.1 |
| Calcium | 13.2 | 0.0 | 0.0 |
| Magnesium | 0.0 | 4.2 | 4.2 |
| Iron | 0.00 | 0.37 | 0.34 |
| Boron | 0.00 | 0.08 | 0.11 |
| Copper | 0.00 | 0.01 | 0.01 |
| Manganese | 0.00 | 0.16 | 0.21 |
| Molybdenum | 0.00 | 0.00 | 0.00 |
| Zinc | 0.00 | 0.01 | 0.01 |

Fig. 2

| KIND NUTRIENT SYSTEM | | | |
|---|---|---|---|
| Base | Grow | Bloom | |
| 4 | 2 | 0 | Total Nitrogen |
| 3.6 | 1.4 | 0 | Nitrate |
| 0.4 | 0.6 | 0 | Ammonium |
| 0 | 2 | 6 | Phosphorus (P2O5) |
| 0 | 4 | 6 | Potassium (K2O) |
| 5 | 0 | 0 | Calcium |
| 0 | 1.6 | 1.6 | Magnesium |
| 0 | 0.14 | 0.13 | Iron |
| 0 | 0.03 | 0.04 | Boron |
| 0 | 0.002 | 0.002 | Copper |
| 0 | 0.06 | 0.08 | Manganese |
| 0 | 0.001 | 0.001 | Molybdenum |
| 0 | 0.004 | 0.005 | Zinc |

Fig. 3

THREE-PART PLANT NUTRIENT SYSTEM

CROSS-REFERENCE TO RELATED APPLICATIONS

The present application claims priority to United States provisional patent application entitled "Three-Part Plant Nutrient System," having Ser. No. 61/809,560, filed on Apr. 8, 2013, which is entirely incorporated herein by reference.

FIELD OF THE INVENTION

The present invention relates to a three-part primary nutrient system for facilitating the growth of a plant in any soilless growing media.

BACKGROUND

Mineral nutrition plays a crucial role in the biochemical economy of green plants. As autotrophic organisms, plants synthesize all of the organic compounds they need for survival from inorganic mineral elements, most of which are derived from the soil.

Plant physiologists have determined that among the 90 or so chemical elements that occur in the earth's crust and atmosphere there are at least seventeen (17) elements that are essential for plant growth. An element is deemed to be essential if, in its absence, a plant fails to grow properly and complete its life cycle in a normal manner. The essential elements are listed in Table 1.

TABLE 1

The Essential Elements and their Chemical Symbols

| | | | |
|---|---|---|---|
| Hydrogen-H | Carbon-C | Oxygen-O | Nitrogen-N |
| Potassium-K | Calcium-Ca | Magnesium-Mg | Phosphorous-P |
| Sulfur-S | Chlorine-Cl | Boron-B | Iron-Fe |
| Manganese-Mn | Zinc-Zn | Copper-Cu | Molybdenum-Mo |

TABLE 2

Major Elements

| | | | |
|---|---|---|---|
| Hydrogen-H | Carbon-C | Oxygen-O | Nitrogen-N |
| Potassium-K | Calcium-Ca | Magnesium-Mg | Phosphorous-P |
| Sulfur-S | | | |

TABLE 3

Minor Elements

| | | | |
|---|---|---|---|
| | Chlorine-Cl | Boron-B | Iron-Fe |
| Manganese-Mn | Zinc-Zn | Copper-Cu | Molybdenum-Mo |

Biological Role of Essential Elements

The essential elements listed in Table 1, are arbitrarily classified as major (macro) or minor (micro), based on the relative amount of each element taken up and utilized by plants. According to most classification schemes, the elements, hydrogen through sulfur (see table 2) are regarded as major elements; the remaining seven (7) are grouped as minor elements (see table 3). Generally speaking, the major elements function as structural components of plant metabolites, besides acting as co-factors for enzymatic reactions. Minor elements primarily function as co-factors for enzymes.

SUMMARY OF THE INVENTION

The present invention is incorporated in a three-part primary nutrient system for facilitating the growth of a plant in soilless growing media. The first part of the nutrient system comprises calcium and nitrogen and is devoid of magnesium, sulfur, and minor minerals. The second part of the nutrient system comprises nitrogen, phosphorus, potassium, and minor minerals and is devoid of calcium. The third part of the nutrient system comprises potassium, phosphorus, and magnesium and is devoid of calcium.

The structure, overall operation and technical characteristics of the present invention will become apparent with the detailed description of a preferred embodiment and the illustration of the related drawings as follows.

BRIEF DESCRIPTION OF THE DRAWINGS OR PICTURES

FIG. 1 illustrates a program for implementing an embodiment of the system.

FIG. 2 illustrates a program for implementing an embodiment of the system.

FIG. 3 illustrates a program for implementing an embodiment of the system.

DESCRIPTION OF THE PREFERRED EMBODIMENTS

In general, this invention is embodied in a three-part nutrient system that separates the calcium from the magnesium and minor minerals allowing growers to easily customize their formulas. As discussed in more detail below, isolating calcium to the first part (base) creates a unique way for a user to selectively combine the second part (grow) and third part (bloom) to meet the specific needs of any grow media in any stage of growth while maintaining the ideal balance for optimum plant growth. Among other things, this system eliminates the need for calcium and magnesium additives or separate formulations based on grow media or water quality.

The first three of the major elements (hydrogen, carbon and oxygen) are derived from the atmosphere and the elements of water; as such, they are not part of the preferred embodiments below.

The First Part—Base

The first part of the nutrient system ("base") functions as a catalyst for both the second and third parts and contains 100% of the calcium. It is preferred that the first part contain an NPK ratio of 4-0-0, plus+5% calcium—and no minor minerals, magnesium, or sulfur. By keeping all the minor minerals out of the first part, a user can customize calcium and nitrogen levels without affecting the balance of these other essential elements. For example, a user using coco coir, reverse osmosis water or a plant requiring high levels of calcium and nitrogen can simply increase the amount of first part (base) to meet these specific needs. Likewise, if the grow media is clay pebbles, rockwool or the water is hard, a user can reduce the first part to meet these other specific needs.

First Part-Base

| Required Elements | "Devoid of" Elements |
|---|---|
| Nitrogen-N | Magnesium-Mg |
| Calcium-Ca | Sulfur-S |
| | Minor Elements |

| First Part-Base Preferred Embodiment |
| --- |
| Nitrogen 3.4%; Calcium 5.0% Contains no minor minerals to allow for custom nutrient formulations |

| First Part-Base Preferred Ranges (by volume) |
| --- |
| Nitrogen 2.6%-4.3% Calcium 3.8%-6.3% Contains no minor minerals to allow for custom nutrient formulations |

The Second Part—Grow

The second part ("grow") comprises nitrogen, phosphorus, potassium, and minor minerals and is devoid of calcium. It is preferred that the second part (grow) contain an NPK ratio of 2-2-4. The second part is designed for the vegetative period of the growth cycle. When used in combination with the other parts meets the precise demands of a plant in any media, at any stage.

| Second Part-Grow | |
| --- | --- |
| Required Elements | "Devoid of" Elements |
| Nitrogen-N Phosphorous-P Potassium-K Minor minerals | Calcium-Ca |

| Second Part-Grow Preferred Embodiment |
| --- |
| Nitrogen 2.3%; Phosphate 1.6%; Potash 3.8%; Magnesium 1.7%; Sulfur 2.3%; Iron 0.28% Minor minerals including: Manganese, Zinc, Copper, Molybdenum .1% |

| Second Part-Grow Preferred Ranges (by volume) |
| --- |
| Nitrogen 1.7%-2.9% Phosphate 1.2%-2.0%; Potash 2.8%-4.8%; Magnesium 1.3%-2.1%; Sulfur 1.7%-2.9%; Iron 0.21%-0.35% Minor minerals including: Manganese, Zinc, Copper, Molybdenum 0.075%-0.125% |

The Third Part—Bloom

The third part ("bloom") comprises potassium, phosphorus, and magnesium and is devoid of calcium. It is preferred that the third part (bloom) contain an NPK ratio of 0-6-6. It is also preferred that the second part have a ratio of elemental phosphorous to potassium of 1-1.2 to encourage healthy branch and stalk development, accelerate flower sets, and maximize crop yields

| Third Part-Bloom | |
| --- | --- |
| Required Elements | "Devoid of" Elements |
| Potassium-K Phosphorous-P Magnesium-Mg | Calcium-Ca |

| Third Part-Bloom Preferred Embodiment |
| --- |
| Nitrogen 1.2%; Phosphate 3.0%; Potash 6.0%; Magnesium 1.6%; Sulfur 2.3%; Iron 0.28% Minor minerals including; Boron, Manganese, Zinc, Copper, Molybdenum .1% |

| Third Part-Bloom Preferred Ranges (by volume) |
| --- |
| Nitrogen 0.9%-1.5%; Phosphate 2.25%-3.75% Potash 4.5%-7.5%; Magnesium 1.2%-2.0%; Sulfur 1.7%-2.9%; Iron 0.21-0.35% Minor minerals including; Boron, Manganese, Zinc, Copper, Molybdenum 0.075%-0.125% |

Preferred Method of Operation

In preferred operation, a user applies the first part to the plant to provide the calcium required during the entire growth cycle of the plant. A user applies the second part of to the plant in order to provide the plant a proper nitrogen and potassium level during the growth cycle. And a user applies the third part of the nutrient system to the plant in order to provide the plant a proper elemental phosphorus and potassium ratio during the growth cycle. Example embodiments of such application are shown in FIGS. 1-3.

As shown in the example programs of FIGS. 1-3, the three part nutrient system can be adjusted to provide maximum results of plant growth depending on the media in which the plant is growing, hardness of the water, and the specific needs of the plant.

While the invention has been described by means of specific embodiments, numerous modifications and variations could be made thereto by those ordinarily skilled in the art without departing from the scope and spirit of the invention set forth in the claims.

What is claimed is:

1. A three-part primary nutrient system for facilitating the growth of a plant in any growing media comprising:
   a first part comprising calcium and nitrogen and devoid of magnesium, sulfur, and minor minerals;
   a second part comprising nitrogen, phosphorus, potassium, and minor minerals and devoid of calcium; and
   a third part comprising potassium, phosphorus, and magnesium and devoid of calcium.

2. The three-part nutrient system of claim 1,
   the first part further comprising calcium in the range of 3.8%-6.3% and nitrogen in the range of 2.6%-4.3%;
   the second part further comprising nitrogen in the range of 1.7%-2.9%, phosphate in the range of 1.2%-2.0%, potash in the range of 2.8%-4.8%, magnesium in the range of 1.3%-2.1%, sulfur in the range of 1.7%-2.9%, iron in the range of 0.21%-0.35%, and minor minerals comprising manganese, zinc, copper, molybdenum, the minor minerals in the range of 0.075%-0.125%; and the third part further comprising nitrogen in the range of 0.9%-1.5%, phosphate in the range of 2.25%-3.75%, potash in the range of 4.5%-7.5%, magnesium in the range of 1.2%-2.0%, sulfur in the range of 1.7%-2.9%, iron in the range of 0.21-0.35%, and minor minerals comprising boron, manganese, zinc, copper, molybdenum the minor minerals in the range of 0.075%-0.125%.

3. A plant nutrient additive for use as a first part in a multi-part primary nutrient system for facilitating the growth of a plant in any growing media, comprising:

a first part comprising nitrogen in the range of 1.2%-2.0%, phosphate in the range of 1.2%-2.0%, potash in the range of 4.5%-7.5%, magnesium in the range of 1.3%-2.1%, sulfur in the range of 1.7%-2.9%, iron in the range of 0.21%-0.35%, and minor minerals comprising manganese, zinc, copper, molybdenum, the minor minerals in the range of 0.075%-0.125% and devoid of calcium;

the first part configured for use with a second part comprising calcium and nitrogen and devoid of magnesium, sulfur, and minor minerals; and the first part configured for use with a third part comprising potassium, phosphorus, and magnesium and is devoid of calcium.

4. A plant nutrient additive for use as a first part in a multi-part primary nutrient system for facilitating the growth of a plant in any growing media, comprising:

a first part comprising nitrogen in the range of 0.9%-1.5%, phosphate in the range of 2.25%-3.75%, potash in the range of 4.5%-7.5%, magnesium in the range of 1.2%-2.0%, sulfur in the range of 1.7%-2.9%, iron in the range of 0.21-0.35%, and minor minerals comprising boron, manganese, zinc, copper, molybdenum the minor minerals in the range of 0.075%-0.125% and is devoid of calcium;

the first part configured for use with a second part comprising calcium and nitrogen and devoid of magnesium, sulfur, and minor minerals; and the first part configured for use with a third part comprising nitrogen, phosphorus, potassium, and minor minerals and devoid of calcium.

5. A three-part primary nutrient system for facilitating the growth of a plant in any growing media comprising:

a first part comprising calcium and nitrogen and devoid of magnesium and sulfur;

a second part comprising nitrogen, phosphorus, and potassium, and devoid of calcium; and a third part comprising potassium, phosphorus, and magnesium and is devoid of calcium.

6. The three-part nutrient system of claim 5, the first part further comprising calcium in the range of 3.8%-6.3% and nitrogen in the range of 2.6%-4.3%;

the second part further comprising nitrogen in the range of 1.7%-2.9%, phosphate in the range of 1.2%-2.0%, potash in the range of 2.8%-4.8%, magnesium in the range of 1.3%-2.1%, sulfur in the range of 1.7%-2.9%, iron in the range of 0.21%-0.35%, and minor minerals comprising manganese, zinc, copper, molybdenum, the minor minerals in the range of 0.075%-0.125%; and the third part further comprising phosphate in the range of 2.25%-3.75%, potash in the range of 4.5%-7.5%, magnesium in the range of 1.2%-2.0%, sulfur in the range of 1.7%-2.9%, iron in the range of 0.21-0.35%, and minor minerals comprising boron, manganese, zinc, copper, molybdenum the minor minerals in the range of 0.075%-0.125%.

\* \* \* \* \*